United States Patent [19]

Barnard

[11] Patent Number: 4,820,048

[45] Date of Patent: Apr. 11, 1989

[54] DETECTOR FOR A SPECTROMETER

[75] Inventor: Thomas W. Barnard, Weston, Conn.

[73] Assignee: The Perkin-Elmer Corporation, Norwalk, Conn.

[21] Appl. No.: 123,025

[22] Filed: Nov. 19, 1987

[51] Int. Cl.[4] .............................. G01J 3/18; G01J 3/36
[52] U.S. Cl. .................................... 356/328; 356/305; 250/372
[58] Field of Search ................. 356/51, 302, 303, 305, 356/307, 326, 328; 250/372

[56] References Cited

U.S. PATENT DOCUMENTS

| | | | |
|---|---|---|---|
| 4,049,353 | 9/1977 | Missio | 356/326 |
| 4,205,229 | 5/1980 | Beer | 356/328 |
| 4,391,523 | 7/1983 | Hildebrand et al. | 356/328 |
| 4,571,074 | 2/1986 | Thevenon | 356/328 |
| 4,690,559 | 9/1987 | Florek et al. | 356/328 |

OTHER PUBLICATIONS

"The Production of Diffraction Grating: II. The Design of Echelle Gratings and Spectrographs", by G. R. Harrison, J. Opt. Soc. Am., 39, 522 (1949).
"Eschelle Spectroscopy with a Charge-Coupled Device (CCD)", by D. G. York, E. B. Jenkins, P. Zucchio, J. L. Lowrance, D. Long and A. Songaila, SPIE, vol. 290, Solid State Imagers for Astronomy, 202 (1981).
"Charge Transfer Devices", by C. H. Sequin and M. F. Tompsett, Academic Press (1975), pp. 11–14, 19–42 and 142–146.
"Review of Charge Injection Device (CID) Technology", by A. B. Grafinger and G. J. Michon, SPIE, vol. 244, Mosaic Focal Plane Methodologies, 26 (1980).

Primary Examiner—F. L. Evans
Attorney, Agent, or Firm—H. S. Ingham; E. T. Grimes

[57] ABSTRACT

A novel solid state array detector is useful in an optical spectrometer of the type that includes a crossed dispersion system receptive of radiation for producing a pair of two dimensional displays of spectral lines characteristic of at least one atomic element. One display is ultraviolet and the other is visible. A solid-state chip has on the front surface a two dimensional array of photosensitive pixels receptive of radiation of selected spectral lines and proximate background radiation. The pixels are arranged in a plurality of sub-arrays with each sub-array consisting of at least one of the pixels and are positioned at a projection location on the front surface of at least one of the selected spectral lines. Electronic components formed on the chip among the sub-arrays are operatively connected to the pixels for producing readout signals correlating with intensities of the selected spectral lines.

21 Claims, 2 Drawing Sheets

FIG. I

DETECTOR FOR A SPECTROMETER

This invention relates to detection of radiation in optical spectrometers, and particularly to a solid state array detector useful in an optical spectrometer of the type that produces a two dimensional display of spectral lines.

BACKGROUND OF THE INVENTION

Various types of optical spectrometers are in use for such purposes as atomic emission spectroscopy, atomic absorption spectroscopy and astronomy. A complete system generally consists of a source of radiation, a spectrometer for separating and detecting individual spectral components, and a data station for processing the information from the spectrometer. The radiation source, for example, may be a system for injecting a test sample into an inductively coupled plasma where the atomic species in the sample are excited to radiate characteristic atomic emission. As another example, a sample is evaporated in a graphite furnace where the gaseous sample absorbs certain frequencies of the incident radiation to provide atomic absorption lines. Similarly, astronomical sources provide atomic emission and absorption lines.

Spectrometers are based on dispersion of radiation by diffraction gratings, prisms and combinations of the two. Generally electronic detection devices are taking over from photographic film for accurate and timely measurements of the emission or absorption lines. A major objective in the development of spectrometers is improvement in detection devices in order to gain sensitivity, dynamic range, signal/noise ratio and speed in the quantitative measurement of atomic species in a test sample or other source.

Spectrometers are frequently designed around available detector technology. There are basically two classes of spectrometers. One involves sequential measurement utilizing a monochromater in which a grating or prism is rotated. The angle is adjusted to correspond to the different emission (or absorption) lines of the elements. A single detector is used, and a measurement process involves relatively rapid rotation of the grating with measurements at a fixed location corresponding to grating angles appropriate to the atomic emission lines.

Spectrometers of the other class are direct readers, in which a full spectrum is displayed across some form of detection system which is capable of detecting the individually focused spectral lines. According to current technology, the best sensitivity is attained by providing a slit for each of the several emission lines being measured, with a photomultiplier tube placed on the opposite side of each slit so as to detect each line. In practice the number of slits with tubes is limited by the size and cost of photomultiplier tubes, so a different slit structure must be used for different types of samples, and there must be some preliminary knowledge of sample composition for choice of slit location.

Since background radiation is generally present, there also must be some method for measuring background in order to correct the emission data. Background measurement presently is effected before and/or after the emission detection. In a sequential system background may be measured for monochromater grating angles proximate those for the atomic emission lines. For direct readers the background is generally measured by shifting the position of the entrance slit and making consecutive measurements.

One of the most sensitive types of spectrometer in current use is an echelle spectrometer which provides a display of spectral lines in two dimensions. This spectrometer and its principles are described in "The Production of Diffraction Grating: II. The Design of Echelle Gratings and Spectrographs" by G. R. Harrison, J. Opt. Soc. Am. 39, 522 (1949). Details of such a system are given in a paper "Echelle Spectroscopy with a Charge-Coupled Device (CCD)" by D. G. York, E. B. Jenkins, P. Zucchino, J. L. Lowrance, D. Long and A. Songaila, SPIE Vol. 290 Solid State Imagers for Astronomy, 202 (1981). Briefly, light passing through an entrance slit is collimated and directed to an echelle grating which has a low density of shaped grooves to produce high order diffraction patterns. The diffracted beam is directed to a second, crossed grating with a higher density of grooves, or a prism, which separates the orders into a two-dimensional pattern. This pattern is focused onto a two-dimensional detecting surface which is configured to detect the individual spectral lines.

There are two types of practical electronic photodetectors. Photomultiplier tubes are quite sensitive but are relatively large and, therefore, are physically incapable of being assembled to detect a number of adjacent lines. Also, a large number of photomultiplier tubes becomes quite expensive.

The other type of photodetector is solid state, based on the principles of charge generation upon the incidence of radiation on a surface such as silicon. To provide resolution of spectral lines (or, more broadly, image resolution) such a surface on a semi-conductor chip is divided into pixel areas. The accumulation and handling of signals from the pixels is effected through the transfer of charges in the chip from the pixels. The technology is detailed, for example, in the book "Charge Transfer Devices" by C. H. Sequin and M. F. Tompsett, Academic Press (1975). Of particular interest are pages 11-14, 19-42 and 142-146 wherein there are described charge-coupled devices (CCD) and their use in image sensing.

A related approach for such detectors is charge injection device (CID) technology. This is described in the article "Review of Charge Injection Device (CID) Technology" by A. B. Grafinger and G. J. Michon, SPIE Vol 244 Mosaic Focal Plane Methodologies, 26 (1980).

Image sensing CCD's and CID's were developed primarily for video cameras involving full area coverage of the image plane. These have been incorporated into spectrometers and other optical systems for astronomy purposes and have been quite useful. The latter use in echelle spectroscopy is presented in the aforementioned paper by York et al., where a 512×320 pixel CCD is described. A problem presented in the paper is high readout noise for such a device. The video type of area detectors have shown limitations in sensitivity associated with the noise that results from the high multiplicity of signals from the full array of pixels on the surface as well as from the high density of solid state channeling of charges and signals in the device.

Further problems with conventional CCD's and CID's include poor sensitivity to ultraviolet radiation due to absorption by the conductor channels, for example polysilicon, which perform the charge transfer; high noise due to the relatively large values of capacitance associated with the conductor channels from all pixels; high data rates for readout which causes high noise; long readout times for large numbers of pixels; limited dynamic range in the ability to handle different light intensities due to saturation of charge at one pixel and consequent spreading of charge into adjacent pixels; and difficulty in obtaining random access of a large number of pixels.

Therefore, a primary object of the present invention is to provide a novel solid state array detector useful in an optical spectrometer of the type that produces a two dimensional display of spectral lines.

A further object is to provide a novel solid state detector of two dimensional spectra that has reduced noise, improved sensitivity, improved dynamic range, reduced readout data rates and random access of pixels for readout.

Another object is to provide a highly sensitive detector of a two dimensional spectral display at reasonable cost.

SUMMARY OF THE INVENTION

The foregoing and other objects of the present invention are achieved according to the present invention by a solid-state detector with a novel arrangement of pixels. The detector comprises a solid-state chip with a front surface having thereon a two dimensional array of photosensitive pixels receptive of radiation associated with selected spectral lines and proximate background radiation. The pixels are arranged in a plurality of sub-arrays with each sub-array consisting of at least one of the pixels. The sub-arrays are positioned at a projection location on the front surface of at least one of the selected spectral lines. Readout means are operatively connected to the pixels for producing readout signals correlating with intensities of the selected spectral lines. The readout means include a plurality of electronic components formed on the chip among the sub-arrays. Preferably, the pixels comprise less than 1% of the front surface of the chip, and the electronic components comprise a plurality of sets of electronic components, with each set being dedicated to a corresponding sub-array proximate the pixels of the corresponding sub-array and isolated from the pixels of the other sub-arrays.

In a preferred embodiment detectors of the present invention are associated with an optical spectrometer that includes a crossed dispersion system. Such a system comprises a first reflective grating receptive of radiation producing a spectrum. A second reflecting grating is arranged such that a first portion of the spectrum is dispersed by the second reflective grating into a first spectral pattern directed to the solid state array detector and a second portion of the spectrum is passed unperturbed by the second reflective grating. A dispersing element is receptive of the second portion for producing a second spectral pattern, and a solid state array second detector is receptive of the second spectral pattern.

DETAILED DESCRIPTION OF THE INVENTION

Figure 1:
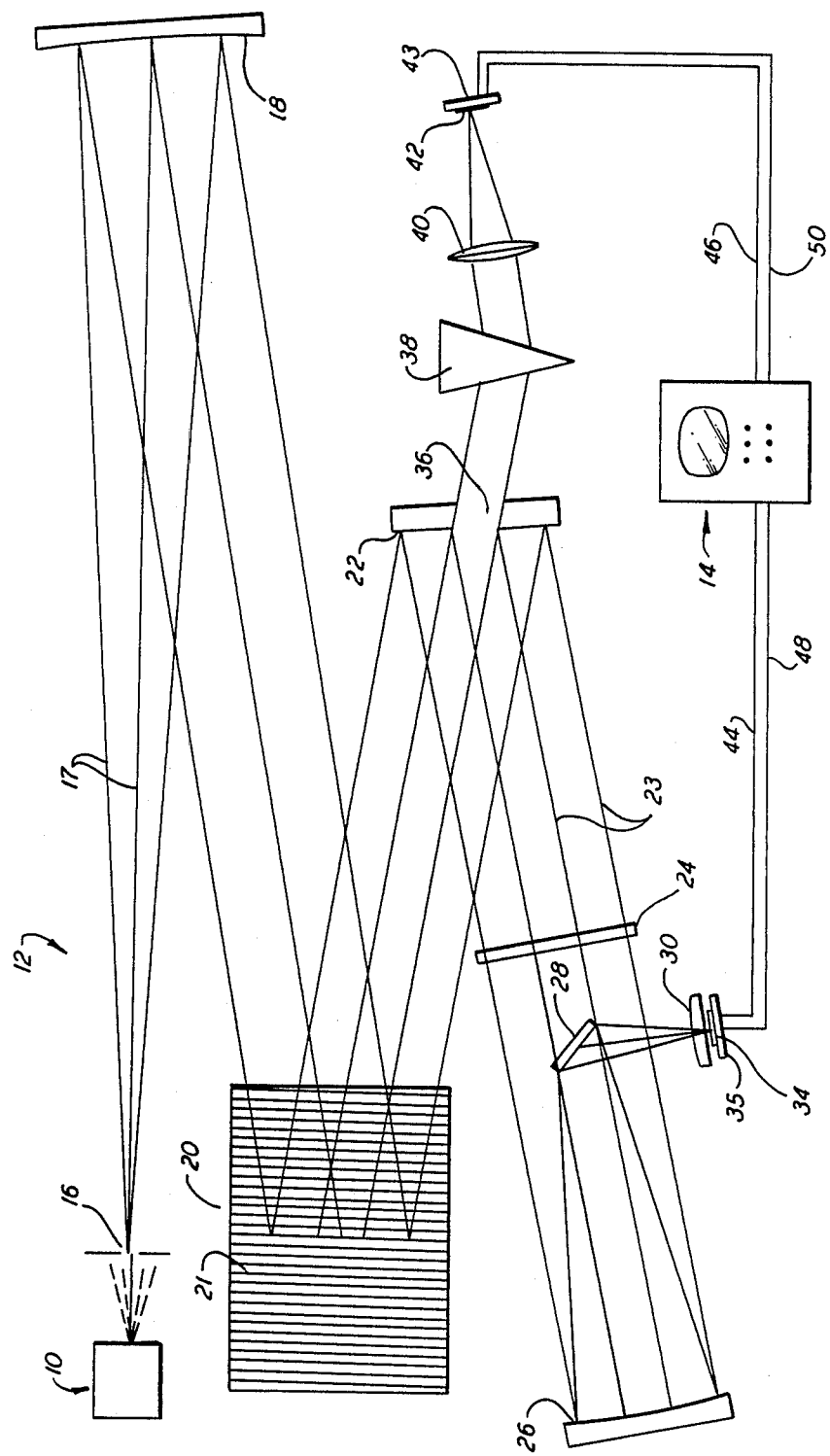
FIG. 1 is a schematic drawing of a spectrographic system including a cross section of an optical spectrometer incorporating detectors.

A spectrographic system which may incorporate detectors of the present invention is shown schematically in FIG. 1. There are, broadly, three components; namely, a source of radiation 10, an optical spectrometer 12, and a data station 14.

Radiation source 10 produces infrared, visible and/or ultraviolet radiation generally characteristic of atomic elements. The source may be, for example, an inductively coupled plasma into which a sample of test material is injected, or a graphite furnace or the like operating to provide emission lines or absorption lines of atomic elements. Alternatively, the source may be extraterrestrial, light being collected by an astronomical telescope.

The purpose of the subsequent components, namely optical system 12 and data station 14, is to provide a quantitative measurement of the atomic elements associated with source 10. Optical system 12, one example being illustrated in FIG. 1, is of the conventional or desired type that produces a two-dimensional display of spectral lines. In particular an echelle system with crossed dispersion is preferred for incorporating the present invention. It also may be desirable, as shown, to have the system divide the light into two components, one covering the generally visible range and the other an ultraviolet range.

Referring to FIG. 1, the light passes through an entrance slit 16 and rays 17 are reflected by a concave collimator 18 to a reflective echelle grating 20. This grating has a relatively low density of shaped grooves 21 and a high blaze angle and is of the known or desired type as described for an echelle system in the aforementioned article by Harrison. Grating 20 has, for example, 790 grooves per centimeter, is blazed at 63° and produces high order spectra. "High order spectra" means at least two orders are produced and that these are higher than first order. Preferably orders 30 to 120 are utilized inclusively. This spectrum is directed to a reflective cross grating 22 with a dispersion oriented at right angles to the first grating 20. Also, as described in Harrison, grating 22 has a higher density of grooves (not shown), for example, 3750 grooves per centimeter. Grating 22 is used at low order with relatively low dispersing power and its cross orientation separates the orders from the first grating 20 into a two-dimensional spectral pattern. "Low order" means equal to or less than about order 5 and is typically first order.

Dispersed rays 23 reflected in a spectral pattern from grating 22 are passed through a Schmitt corrector 24 to a concave spherical reflector 26 which focuses it by way of a flat mirror 28 and a field flattener lens 30 onto a first detector 34. The two dimensional echelle spectral pattern in this portion of the instrument is chosen to be in the ultraviolet range.

Other conventional or desired optical systems may be used. For example, the conventional Schmitt corrector 24 may be replaced by aspherical shaping of grating 22 as described in copending patent application Ser. No. 123,025 filed Nov. 19, 1987.

In the present example, cross grating 22 has a central opening 36 through which about 20% of the radiation is passed. A dispersing element, preferably a prism 38, in crossed position with respect to echelle grating 20, picks up this portion of the radiation and provides a two dimensional echelle spectrum in the visible range. This spectrum is projected and focused by an achromatic lens 40 onto a second detector 42. Thus advantage may be taken of specialized optics and detectors for the separate ultraviolet and visible ranges.

The atomic emission line wavelengths are invariant so their relative positions are the same for identical echelle spectrometers.

Detectors 34,42 are mounted on printed circuit (PC) boards 35,43 respectively. These detectors are sensitive to the impinging radiation, producing signals that are further processed by circuitry on the PC boards and then directed to data station 14 on lines 44,46 respectively. The station includes a data processor and gives an appropriate presentation of the information in graphic or numerical form, as a display and/or printout. The data station (or PC board) also may provide timing control signals on lines 48,50 respectively to the detectors as described below.

Figure 2:
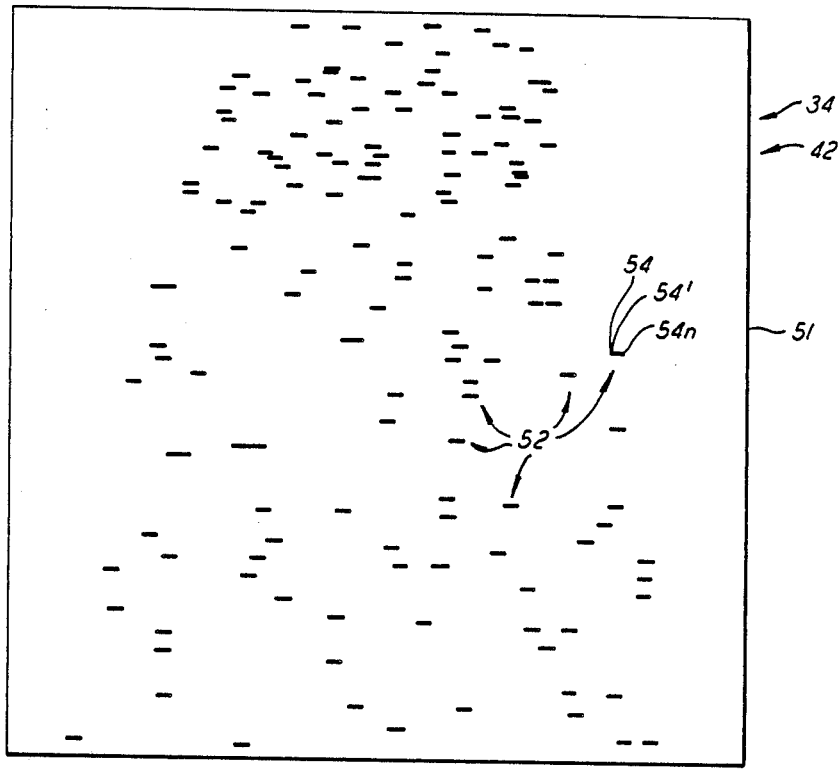
FIG. 2 is a schematic view of the front surface of a detector showing sub-arrays of pixels according to the present invention.

According to the present invention and as indicated by FIG. 2, each detector 34,42 is a solid-state integrated circuit chip 51 with pixel groups or sub-arrays 52 having photosensitivity receptive of only a small portion of the spectrum that may be focused across the front surface of the detector. Generally less than about one percent of the surface area of the detector need be receptive, for example, only about 0.1% is receptive. The receptive locations chosen correspond to the foci of those selected spectral lines that are sufficient for measurement of the presence and quantity of atomic elements that may be present in the emission source preferably any and all such elements. In addition, a further portion of the detector is structured to receive radiation at wavelengths proximate the desired spectral lines in order to provide a measure of background radiation.

FIG. 2 shows an example of an array of positions on a detector chip receptive of radiation according to the present invention. The chip is, conveniently, about 15 mm by 15 mm. The particular array shown is selected for 120 spectral lines corresponding to 45 atomic elements, and covers the ultraviolet range. Generally the expected ultraviolet wavelength capability is from about 190 nm to about 400 nm, and the visible range from 400 to 800 nm. A similar chip is devised for the visible range. In a preferred embodiment the arrays for both ranges are placed on one chip such that chips of the same configuration may be utilized for each of the two separated ranges of the spectrometer, with only the ultraviolet portion in use as detector 34, and only the visible portion in use as detector 42.

Each sub-array 52 may consist of only one pixel but preferably comprises a plurality of pixels such as 10 to 20 pixels, for example 16 pixels. Three of the individual pixels on a sub-array are designated as 54,54',54n as indicated in FIG. 2. Each pixel is an elongated spot, such as a rectangle having an aspect ratio of about four to one and is, for example, 25 by 100 micrometers. Each pixel is receptive of radiation impinging on it to produce a signal for processing in proportion to the intensity of the radiation. The pixels are aligned in parallel, as shown, to receive parallel lines of radiation. Separation of pixels is as small as practical, such as up to 50 micrometers.

Generally each sub-array is positioned and dimensioned such that one pixel, or two or three adjacent pixels, will be receptive of the radiation of a corresponding atomic emission spectral line to be analyzed. The other pixels in the same sub-array serve two purposes. One, as mentioned above, is to simultaneously detect background radiation close to the spectral line in order to correct for background. The other purpose is to provide a range of available pixel positions for the spectral line so that an exact pre-determination of line position focused by the optics is not necessary.

The pixels are photosensitive spots formed on the surface of a solid state chip. Generally the chip material is a semiconductor, for example silicon. The detector desirably is derived from the type of device generally categorized as a charge transfer, device such as a charge injection device (CID) or preferably a charge coupled device (CCD).

Figure 3:
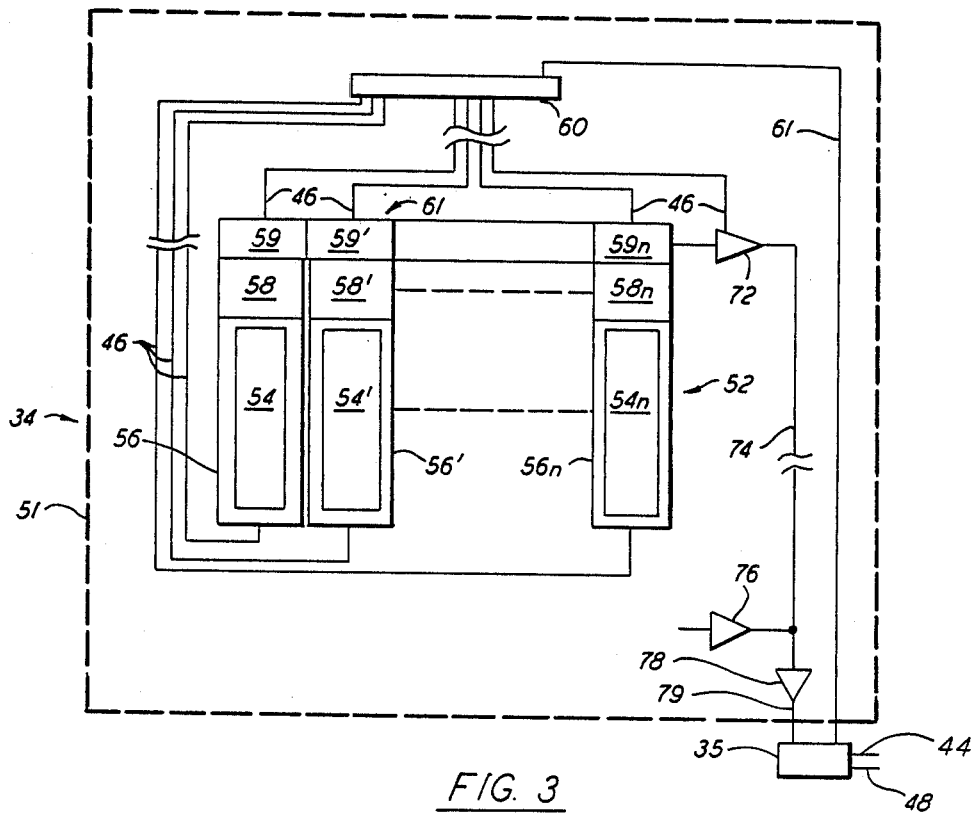
FIG. 3 is a detail of one embodiment of a sub-array and associated electronic components.

FIG. 3 shows an embodiment in the form of a layout on a portion of a chip 51, according to the present invention, of a sub-array 52 of three pixels 54,54',54n and some associated electronic components formed in the chip among the sub-arrays for collecting the signals from each pixel. The basic chip is formed conventionally of appropriately doped silicon material.

The photosensitive pixel areas each consists of silicon coated to enhance absorption of photons at the wavelengths of interest, for example with silicon nitride, silicon dioxide or both. The adjacent areas are covered with an opaque mask to block unwanted light and, following conventional CCD technology, with various conductor, semiconductor and insulating materials, are designed to transfer and readout the photoelectric charges. In the embodiment of FIG. 3, surrounding each pixel, such as pixel 54, is a conductive metal layer 56 e.g. polysilicon or aluminum which acts as a capacitive element forming a storage register thereunder to capture charges generated in the exposed center region which migrate by diffusion or are attached by fringing fields. Overlapping this conductive layer, but separated by an insulating layer is another conductor layer 58 associated with layer 56 in the usual CCD bucket brigade device configuration. A third conductor 59 is then similarly arranged so that with the usual CCD voltage biasing sequence on the three conductors, the photoelectric charge can be moved completely from under the first conductor to the third conductor. Additional conductors and appropriately doped regions to form gates (not shown) between layers 56,58,59 may be utilized. Pixels 54' . . . 54n similarly have brigaded conductor areas 56',58',59' to 56n,58n,59n.

The set of third conductors 59,59' . . . 59n from each of the adjacent pixels in the sub-array are themselves connected in a CCD bucket brigade sequence in the orthogonal direction by means of the conventional CCD overlapping but insulated conductors and gates (not shown) which collectively constitute a readout register 61.

Finally, the last third conductor 59n, e.g. the sixteenth, is connected to an adjacent buffer amplifier 72 implemented in the silicon substrate which amplifies the photoelectric charge signal to a common path 74 with a gain such that the signal sufficiently exceeds the signal from sources of electrical noise. FIG. 3 also illustrates a buffer transistor 76 from one of the other sub-arrays (not shown) connected to the common path.

Connected to the various conductive layers and transistors are conductive leads (collectively 46) to a source of timed voltage pulses in a control circuit 60. Such a circuit is implemented by digital logic, e.g. further gates and shift registers, and is located on the chip. Preferably an external clock signal and other external signals from computer 14, via line 48 (or 50), PC board 35 (or 43) and line 61, control timing and random access selection of sub-arrays for readout in the conventional manner. Control signals also select which of the buffer amplifiers actively drives its signal into a final high gain 78 buffer amplifier which conditions the signal for readout off the chip on line 79 to PC board 35 and hence on line 44 to computer 14. Thus means for readout of the charges from the pixels comprise, collectively, the conductive areas and gates and appropriate doping and insulating layers that form a set of electronic components dedicated to each sub-array. Readout signals correlate with intensities of the selected spectral lines.

Conventional coordination with the timing signals provides the information for readout of the information on spectral line intensities. The data processing will also include measurement of the background radiation from adjacent pixels and subtraction from the spectral line signals. Precise readouts are obtained after calibration with a known radiation source. To further minimize noise, the chip should be cooled, for example, by liquid nitrogen or a Peltier thermoelectric cooler.

A second embodiment for the implementation of photosensitive pixels is to use a buried channel conductor in the silicon for the entire region of pixels 54,54′ . . . 54n and adjacent electronic components. Again, the pixel surface is coated for optimal photo sensitivity at the wavelengths of interest. Buried channel technology is as described, for example, in the aforementioned book by Sequin et al. Thus each sub-array may be formed as a linear array in which the individual photosensors are isolated from the readout register by a transfer gate. In this case, the conductors 56 of FIG. 3, surrounding each pixel 54, are omitted and the charges are collected directly under conductor 58. Other aspects of the configuration and operation are similar to the embodiment of FIG. 3. The pixels may be closer together in this second embodiment and the efficiency of photosensitivity is increased.

A highly beneficial feature of the present invention is that the electronic components constructed in the chip for collecting signals from the pixels, including the storage registers, catchment registers and buffer transistors, utilize space on the chip between sub-arrays of pixels. It is also important that each set of electronic components directly associated with and dedicated to a corresponding sub-array be closely adjacent to the pixels of the sub-array and be isolated from the pixels of neighboring and all other sub-arrays, thus minimizing cross-capacitive effects. Generally the associated electronic components should be located within about two pixel lengths distance from the pixel areas. Substantial improvements in sensitivity by reductions in cross talk and noise level are attained thereby. With improved signal/noise ratio and dynamic range, performance levels associated with photomultiplier tubes are approached, without the substantially higher cost of a large number of photomultiplier tubes. Furthermore, background measurements are simultaneous rather than sequential to the line detection, gaining further speed and accuracy. Also, the complexity and cost of internal electronics is reduced by specializing the detector for those spectral regions of interest and implementing control logic on the chip.

In addition, the sub-arrays can be randomly addressed for readout which increases the speed and flexibility of the device for specific applications without overburdening the electronics with excessively high data rates. Random access is effected by, e.g., an 8-bit code signal from computer 14 to control circuit 60 on chip 51 via PC board 35. The code signal triggers an appropriate sequence of voltages to the electronic components of the sub-array being addressed for a readout. The relatively small number of sub-arrays on the chip, compared to full area coverage of pixels on a conventional image sensor, make such random access quite practical.

The spectrometer system described herein for providing separated ultraviolet and visible spectra allows for further precision in producing spectral lines. It is especially useful with the array detectors of the present invention.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A solid state array detector useful in an optical spectrometer of the type that includes a crossed dispersion system receptive of radiation for producing a two dimensional display of spectral lines characteristic of at least one atomic element, comprising:
   a solid-state chip with a front surface having thereon a two dimensional array of photosensitive pixels receptive of radiation of selected spectral lines and proximate background radiation, the pixels being arranged in a plurality of sub-arrays with each sub-array consisting of at least one of the pixels and being positioned at a projection location on the front surface such as to be receptive of at least one of the selected spectral lines and the proximate background radiation, each sub-array having an area on the surface only at a corresponding projection location of the selected spectral line and the proximate background radiation; and
   readout means operatively connected to the pixels for producing readout signals correlating with intensities of the selected spectral lines, the readout means including a plurality of electronic components formed in the chip among the sub-arrays.

2. A detector according to claim 1 wherein each pixel is defined by an elongated spot on the chip and each sub-array consists of at least two pixels aligned in parallel.

3. A detector according to claim 2 wherein each sub-array consists of 10 to 20 pixels.

4. A detector according to claim 1 wherein the pixels comprise less than about 1% of the front surface of the chip.

5. A detector according to claim 1 wherein the plurality of electronic components comprises a plurality of sets of electronic components, each set being dedicated to a corresponding sub-array proximate the pixels of the corresponding sub-array and isolated from the pixels of the other sub-arrays.

6. A detector according to claim 1 in the form of a charge coupled device.

7. A detector according to claim 6 wherein, for each sub-array, corresponding charges are generated in each of the pixels in response to the spectral lines and the background radiation, and the electronic components comprise a multiplicity of storage registers arranged such that one storage register is adjacent to and cooperatively associated with each pixel for storing the corresponding charges, a readout register arranged proximate the storage registers such as to be receptive of the charges from the storage registers, amplifier means proximate the sub-array and operatively connected to the readout register for producing the readout signals from the charges, and shifting means receptive of timing signals for sequentially shifting the charges from the pixels through the storage registers and the readout register to the amplifier means.

8. A detector according to claim 7 wherein the amplifier means comprises a buffer transistor.

9. A detector according to claim 1 further comprising means for random access addressing of the sub-arrays.

10. An optical spectrometer including a crossed dispersion system receptive of radiation for producing a two dimensional display of spectral lines characteristic of at least one atomic element, and a solid state array detector of the spectral lines, the detector comprising:

a solid-state chip with a front surface having thereon a two dimensional array of photosensitive pixels receptive of radiation of selected spectral lines and proximate background radiation, the pixels being arranged in a plurality of sub-arrays with each sub-array consisting of at least one of the pixels and being positioned at a projection location on the front surface such as to be receptive of at least one of the selected spectral lines and the proximate background radiation, each sub-array having an area on the surface only at a corresponding projection location of the selected spectral line and the proximate background radiation; and readout means operatively connected to the pixels for producing readout signals correlating with intensities of the selected spectral lines, the readout means including a plurality of electronic components formed in the chip among the sub-arrays.

11. An optical spectrometer according to claim 10 wherein each pixel is defined by an elongated spot on the chip and each sub-array consists of at least two pixels aligned in parallel.

12. An optical spectrometer according to claim 10 wherein each sub-array consists of 10 to 20 pixels.

13. An optical spectrometer according to claim 10 wherein the pixels comprise less than about 1% of the front surface of the chip.

14. An optical spectrometer according to claim 10 wherein the plurality of electronic components comprises a plurality of sets of electronic components, each set being dedicated to a corresponding sub-array proximate the pixels of the corresponding sub-array and isolated from the pixels of the other sub-arrays.

15. An optical spectrometer according to claim 10 further comprising means for random access addressing of the sub-arrays.

16. An optical spectrometer according to claim 10 in the form of a charge coupled device.

17. An optical spectrometer according to claim 10 wherein the crossed dispersion system comprises a first reflective grating receptive of radiation for producing a spectrum, a second reflective grating arranged such that a first portion of the spectrum is dispersed by the second reflective grating into a first spectral pattern directed to the solid state array detector and a second portion of the spectrum is passed unperturbed by the second reflective grating, a dispersing element receptive of the second portion for producing a second spectral pattern, and a solid state array second detector receptive of the second spectral pattern.

18. An optical spectrometer according to claim 18 wherein the solid state array detector and the solid state array second detector are configured substantially the same.

19. An optical spectrometer according to claim 16 wherein the second reflective grating is such as to produce the first spectral pattern substantially as an ultraviolet spectrum and the dispersing element is such as to produce the second spectral pattern substantially as a visible light spectrum.

20. An optical spectrometer according to claim 17 wherein the second reflective grating has a central opening therein for passing therethrough the second portion of the spectrum.

21. A solid state array detector useful in an optical spectrometer of the type that includes a crossed dispersion system receptive of radiation for producing a two dimensional display of spectral lines characteristic of at least one atomic element, comprising:

a solid-state chip with a front surface having thereon a two dimensional array of photosensitive pixels receptive of radiation of selected spectral lines, the pixels being arranged in a plurality of sub-arrays with each sub-array consisting of at least one of the pixels and being positioned at a projection location on the front surface such as to be receptive of at least one of the selected spectral lines, each sub-array having an area on the surface only at a corresponding projection location of the selected spectral line; and readout means operatively connected to the pixels for producing readout signals correlating with intensities of the selected spectral lines, the readout means including a plurality of electronic components formed in the chip among the sub-arrays.

* * * * *

UNITED STATES PATENT OFFICE
CERTIFICATE OF CORRECTION

Patent No. 4,820,048  Dated April 11, 1989

Inventor(s) Thomas W. Barnard

It is certified that error appears in the above-identified patent and that said Letters Patent is hereby corrected as shown below:

In column 6, line 33, change "attached" to --attracted--.

In column 9, line 42, change "claim 10" to --claim 11--.

Signed and Sealed this

Eleventh Day of August, 1992

Attest:

DOUGLAS B. COMER

*Attesting Officer*  *Acting Commissioner of Patents and Trademarks*